April 12, 1960 K. A. MARGGRAF ET AL 2,932,546
INSTRUMENT MOUNTING
Filed July 29, 1957
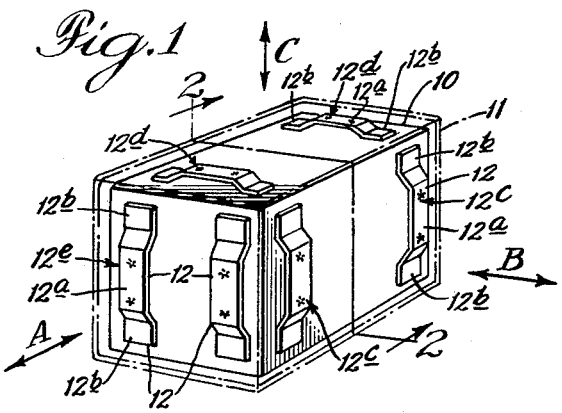
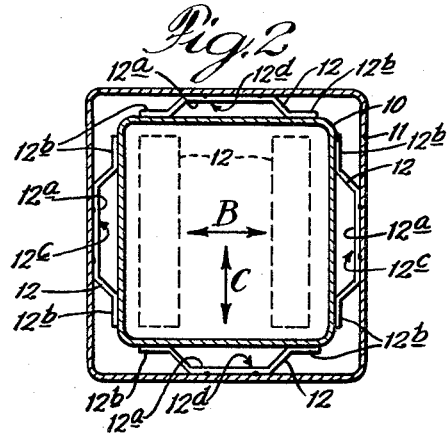
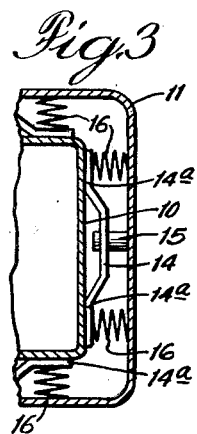
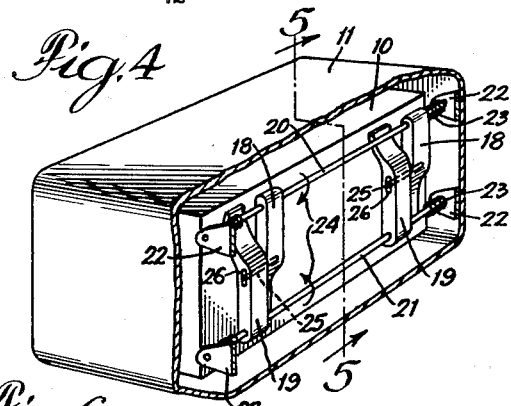
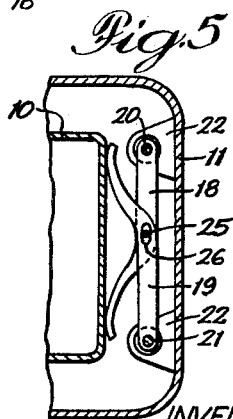
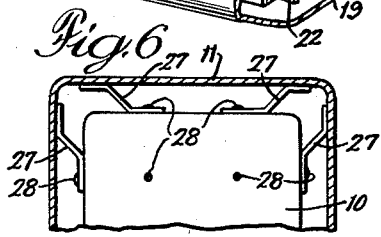
INVENTORS:
Kurt A. Marggraf
and Werner P. Massmann,
BY Bair, Freeman & Molinare
ATTORNEYS.

United States Patent Office
2,932,546
Patented Apr. 12, 1960

2,932,546

INSTRUMENT MOUNTING

Kurt A. Marggraf, Parma Heights, and Werner F. Massmann, North Royalton, Ohio, assignors to Ampatco Laboratories Corporation, Cleveland, Ohio, a corporation of Delaware Application July 29, 1957, Serial No. 674,840

4 Claims. (Cl. 312—352)

This invention is concerned with a mounting and more particularly with a mounting for sensitive instruments.

Many sensing and control instruments, particuarly those including radio, television and radar components, are extremely delicate and it is important that they be provided with suitable mountings when they are installed in locations subject to vibrations, as in aircraft. The mountings heretofore available, such as rubber vibration absorbers, have been generally unsatisfactory as they require a lot of space. This is particularly troublesome in aircraft where space and weight are extremely important considerations and particularly in view of the fact that many of the instruments used in aircraft must be mounted on one or another of the axes of the craft, or at the center of gravity thereof; areas which are generally crowded with other equipment.

A principal object of the present invention is the provision of a new and improved mounting, particularly designed for sensitive instruments, in which space requirements are minimized.

One feature of the invention is the provision of resilient means acting on an object to be mounted, urging it toward a desired position in one plane, and means acting on the object in another plane for damping vibrations thereof in said one plane. Another feature is that the means which damp the vibrations also urge the object toward a desired position in said another plane.

A further feature is the provision of spring means having a plurality of portions associated with the object to urge it toward a desired position in each of three mutually perpendicular planes, the spring portions bearing against the object whereby vibration in one plane is frictionally damped by the portions thereof which urge the object toward the desired position in the other planes. Still another feature is that the portions bearing against the object are generally flat, minimizing space requirements for the mounting.

Further features and advantages will readily be apparent from the following specification and from the drawings, in which:

Figure 1 is a perspective view of the mounting with the outer housing shown in broken lines;

Figure 2 is a section taken along line 2—2 of Figure 1, with the outer housing shown in full lines;

Figure 3 is a fragmentary sectional view of a modification;

Figure 4 is a perspective view of another modification;

Figure 5 is a fragmentary section taken along line 5—5 of Figure 4, and

Figure 6 is a fragmentary section of still another modification.

The proper operation and in many instances the entire control of devices such as aircraft and missiles depend on sensitive instruments, as gyroscopes, accelerometers, radio components and the like, which must be mounted in the craft in such a manner that they are free from vibration effects. Previously used mountings often employ rubber vibration absorbing members or complicated spring assemblies, all of which take up a great amount of space and make access to the instruments difficult in the event adjustment or repair is necessary.

Turning now to Figures 1 and 2 of the drawings, an embodiment of the present invention is shown. The instrument, such as a gyroscope (not shown), or other object to be mounted is contained in an inner instrument casing 10 which is surrounded by an outer casing 11. The inner casing is here shown as a regular six-sided polygon, but may take any desired shape.

Mounted on the inner wall of the outer housing 11 are a plurality of spring members 12. Each spring member is generally U-shaped and has a center portion 12a which is secured, as by welding, to the outer housing. The ends 12b of the legs of the spring members are elongated and extend outwardly providing a substantial surface in contact with the instrument casing 10. It will be understood that the arrangement of spring members shown in Figure 1 is duplicated on the sides of the mounting which are hidden in that view. While there are two spring members acting on each of the six surfaces of the instrument casing in the embodiment shown, this number may be varied according to the requirements of each installation.

Referring particularly to Figure 2 it is seen that the spring members are arranged in opposite pairs, such as the pair 12c and the pair 12d, one of the third pair being shown in Figure 1 at 12e. Each pair of spring members tends to center the object or instrument casing 10 in one plane. The three sets of springs act on the instrument casing to center it in each of the three planes A, B and C indicated in Figure 1 and the outer housing 11 may be so mounted in the aircraft or other device, that the instrument when at rest is in exactly the desired position.

Vibrations to which the instrument may be subjected can be resolved into vibration components acting in the direction of one or more of the axes A, B or C. If a vibration is considered which acts along the B axis, reference to Figure 2 shows that the opposite spring members 12c will flex in accordance with the vibration. At the same time the opposite spring members 12d and the opposite spring members 12e act on their respective faces of the instrument casing 10 to damp the movement of the instrument, reducing the amplitude of the vibrations and bringing them rapidly to an end. During the damping operation the end portions 12b of the springs 12 frictionally engage the surface of instrument casing 10 to accomplish the damping action.

If vibration acts along the A axis, the opposite spring members 12e tend to center the casing 10 while the spring members 12c and 12d provide frictional damping. Similarly for vibrations along the C axis the instrument casing is centered by the springs 12d while the spring members 12b and 12c act on the casing to damp its movement. Thus, it can be seen for any vibration component acting along one of the axes A, B and C, one set of spring members, comprising complementary pairs of springs on opposite sides of the object, tend to center the object in one plane while the spring members which tend to center the object in the other planes exert frictional vibration damping forces on the object.

The relatively flat spring structure, with U-shaped spring members having outwardly extending end portions, requires very little space so that the outer housing 11 is only slightly larger than the instrument casing 10, thereby greatly minimizing the space requirements.

Turning now to Figure 3, a modification of the spring members is shown. Here a metal plate or strip 14, which is similar in shape to the spring member 12 and having end portions 14a of substantial area in contact with the outer surface of the instrument casing 10 is slidably mounted on a pin 15 secured to the outer housing 11. Coil springs 16 are placed between the end portions 14a and the housing 11 urging the strips into frictional engagement with the instrument casing. Of course, strips 14 and springs 16 are provided on all six sides of the instrument casing to center it in the desired position, as shown in Figure 1. Again, vibration in one plane is damped by the centering elements acting in the other two planes.

Some instruments, such as displacement gyros and accelerometers require a mounting which will always return them to exactly the same zero position. The friction of the spring mountings of Figures 1–3 might result in the instrument casing lodging in a slightly off-centered position as a result of a shock stress, for example. For applications of this type, the mounting arrangement of Figures 4 and 5 is preferable.

Here, two shafts 20 and 21 are pivotally mounted in bearings 22 in the outer housing so as to extend along the upper and lower edges of the instrument casing 10. Two pairs of rigid metal arms are shown, each pair being made up of an arm 18 secured to the shaft 20 and an arm 19 secured to the shaft 21. The shafts 20 and 21 are biased by springs 23 to rotate in the directions shown by the arrows 24 urging the arms to frictionally engage against the instrument casing 10. The arms 18 and 19 of each pair are loosely coupled by pin 25 which may be secured to arm 18 and extend into an elongated slot 26 in arm 19. The loose connection between the arms of each pair prevents the instrument and its casing from twisting more than a small amount so that the instrument will not jam, but always returns to the same zero position. Similar arrrangements are, of course, provided acting on the other faces of the instrument casing and provide friction damping of vibrations.

In Figure 6 we show a modification of the springs illustrated in Figure 2 in which the springs are illustrated at 27 and may be secured, each at one end, to the instrument casing 10 as by rivets 28. Their opposite ends frictionally engage the interior of the housing 11 as illustrated and the operation for both vibration absorbing and frictional damping would be substantially similar to that already described in connection with Figures 1 and 2.

Some changes may be made in the construction and arrangement of the parts of our instrument mounting without departing from the real spirit and purpose of our invention, and it is our invention to cover by our claims any modified forms of structure or use of mechanical equivalents which may reasonably be included within their scope.

We claim as our invention:

1. In a mounting of the character described for an object, an outer housing for said object, pairs of supports pivotally mounted in said housing, a slot and pin connection between them to synchronize their pivotal movement, an object contacting arm extending from each of said supports, and spring means urging each support in a direction to bring said arms into frictional engagement with said object.

2. In a mounting of the character described for an object, an outer housing for said object, pairs of supports pivotally mounted in said housing, an object contacting arm extending from each of said supports, spring means urging each support in a direction to bring said arms into frictional engagement with said object, and means for loosely interconnecting each pair of said arms.

3. In a mounting of the character described for an object, an outer housing for said object, pairs of pivot rods mounted in said housing, pairs of object supporting arms fixed at one end on said rods with their other ends adapted to engage said object, and springs wound on said rods and, through said rods, urging said supporting arms into engagement with said object.

4. In a mounting of the character described for an object, an outer housing for said object, pairs of pivot rods mounted in said housing, pairs of object supporting arms fixed at one end on said rods with their other ends adapted to engage said object, and springs wound on said rods and urging said supporting arms through said rods into engagement with said object, said supporting arms being loosely connected together intermediate their ends for synchronized movement during operation.

References Cited in the file of this patent

UNITED STATES PATENTS

| | | |
|---|---|---|
| 43,121 | Marshal | June 14, 1864 |
| 925,507 | Redick | June 22, 1909 |
| 1,320,288 | Stewart | Oct. 28, 1919 |
| 1,766,597 | Bushnell | June 24, 1930 |
| 1,877,551 | Bruce | Sept. 13, 1932 |
| 2,394,853 | Goddard | Feb. 12, 1946 |
| 2,588,732 | Kemp | Mar. 11, 1952 |
| 2,762,678 | Moore | Sept. 11, 1956 |

FOREIGN PATENTS

| | | |
|---|---|---|
| 372,342 | France | Feb. 16, 1907 |